United States Patent Office 2,952,866
Patented Sept. 20, 1960

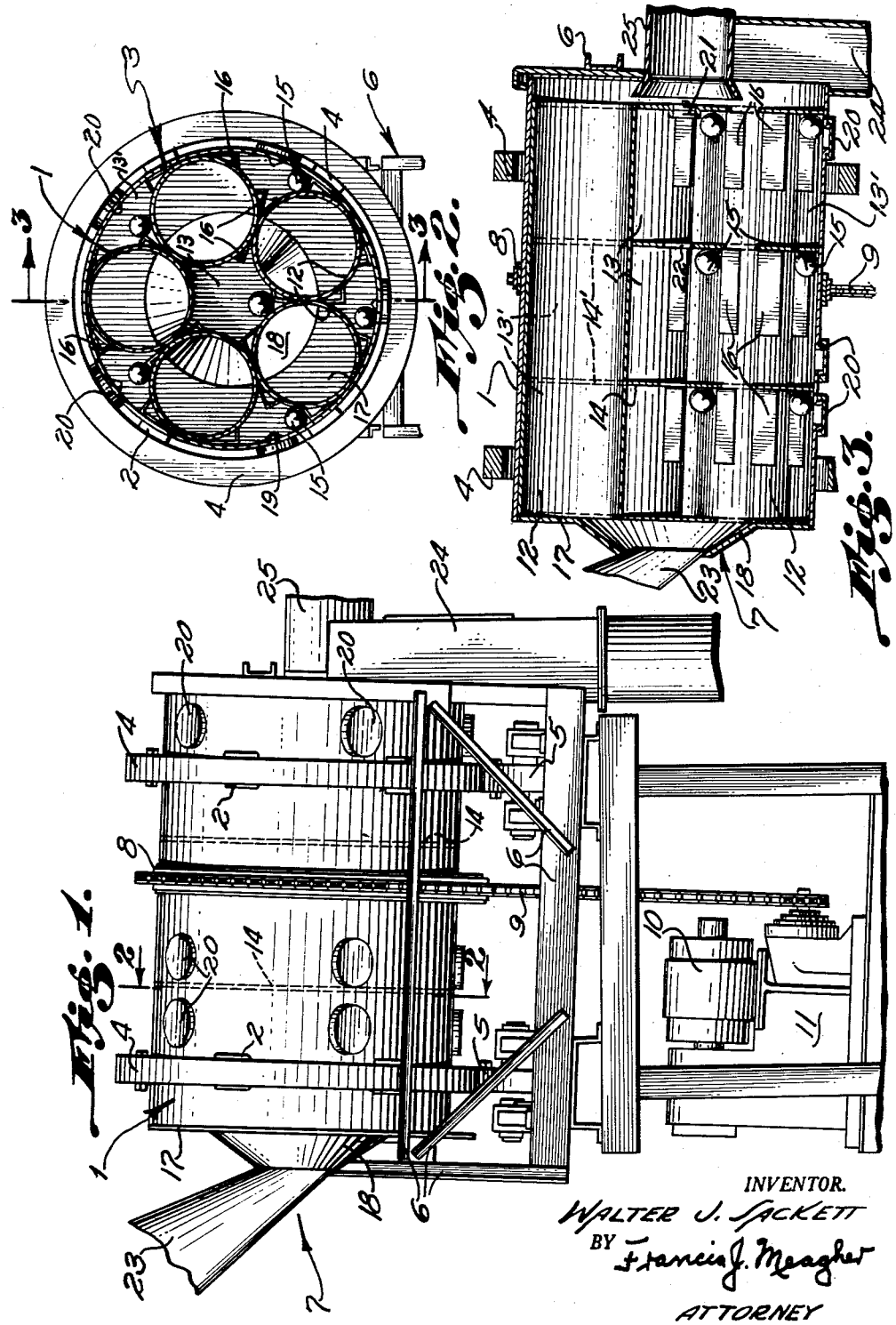

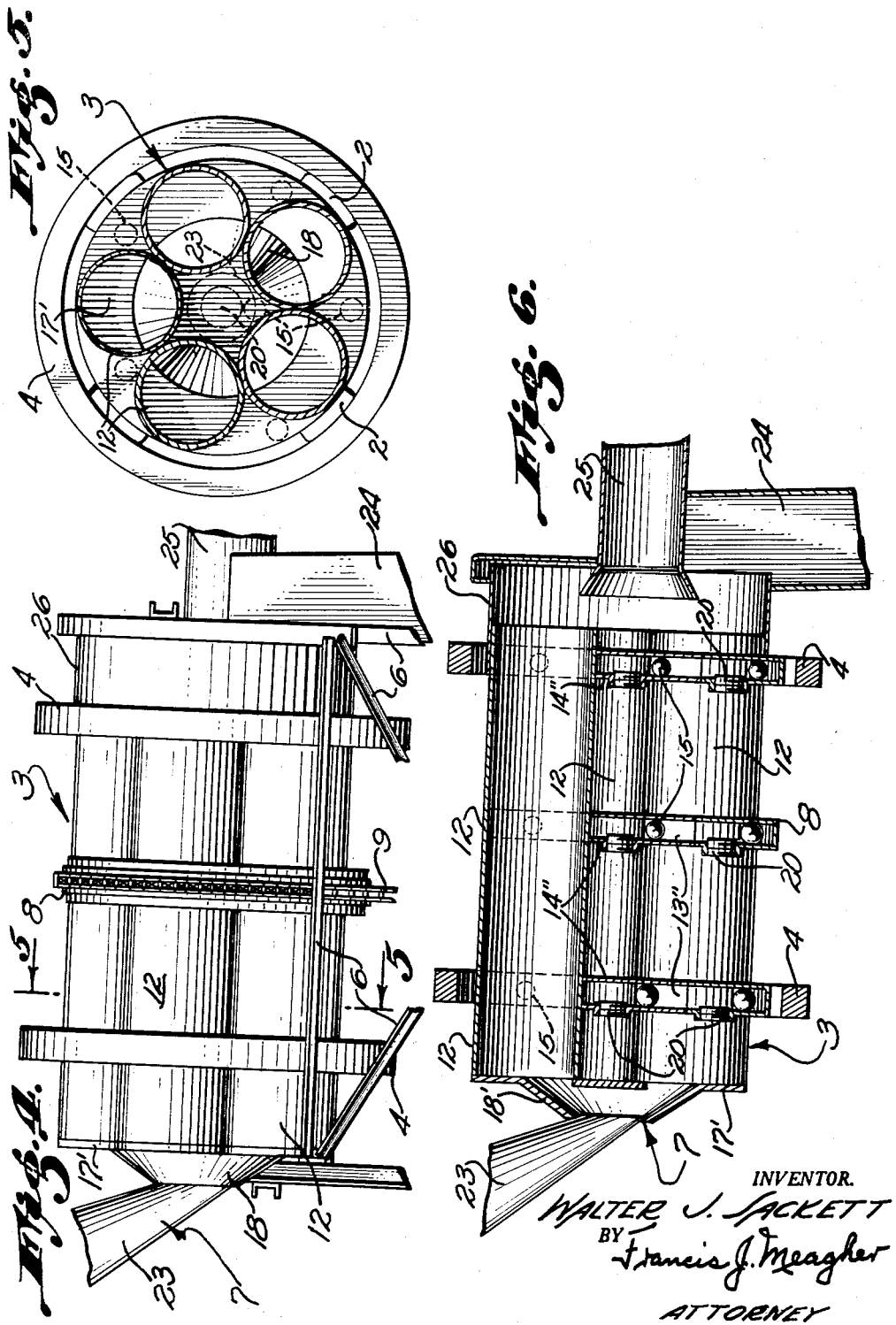

2,952,866

APPARATUS FOR FORMING POWDERED MATERIALS INTO GRANULES OR PELLETS

Walter J. Sackett, 3700 Echodale Ave., Baltimore 6, Md.

Filed Oct. 19, 1956, Ser. No. 617,125

4 Claims. (Cl. 18—1)

This invention relates to an apparatus which may be called a granulator, for forming granules or pellets, by an intensive rolling or tumbling action of moist powders or other materials having similar physical characteristics and by surface hardening the pellets by passing them through a forced draft of air, and which is an improvement over the apparatus disclosed in my U.S. Patent 2,871,510.

This invention is used for granulating or pelletizing moist powdered fertilizer compounds and moist powdered animal feed products, and is adapted for granulating moist powdered food products, medical products and other types of products.

Commercial fertilizers and commercial animal feeds have in the past been dispensed in powdered form. This has been found to be unsatisfactory because a great quantity of the product was lost to the wind. A great quantity of the product has been lost by caking to machinery and food troughs. Powdered fertilizers have not been assimilated into the soil. Powdered feed products have been blown away, mingled in the soil and become stuck in food troughs and other apparatus. Therefore, there has arisen a great demand for commercial fertilizers and animal feeds and many other products in granular or pellet form rather than in powdered form. And there have been developed various means and machines to accomplish this end.

Heretofore, in efforts to granulate such materials, the particles or pellets have so widely varied in size, and so much of the initial material input has failed to form into pellets as to cause a large portion, sometimes over one-half of said initial input, to pass a twenty-four mesh screen. This fine portion is not acceptable as a granular product and must be re-run through further moisture treatment and re-granulated into particles of sufficient size for commercial acceptance, the particle size which is generally acceptable as a granular product is one passing through a six mesh screen and which is retained on a twenty-four mesh screen.

The object of this invention is to provide an apparatus which will form the maximum quantity of material placed therein into commercially acceptable granular or pellet form in a single run therethrough and to surface harden the granules or pellets by subjecting them to a forced air stream.

To these and other objects which will appear from the following specification claims and drawings, the apparatus of the present invention comprises five elongated, hollow, cylindrical tubes arranged securely in a circular cluster so that the longitudinal axes of the tubes are parallel and so that the longitudinal axis of each tube is parallel to and equidistant from the longitudinal axis of the cluster. The cluster forms a central chamber having a star-shaped cross-section. The longitudinal axis of the cluster is set at an angle to the horizontal and the cluster revolves around its longitudinal axis. The powder to be pelletized is deposited in the elevated end of the cluster and is deposited only in the tubes. As the cluster rotates the moist powder rolls or tubles on the inner surfaces of the tubes and slowly advances through the tubes to the lower end of the cluster and in the process is formed into pellets. A stream of air passes through the tubes from the lower end of the cluster to the higher end thereof and aids in the forming of pellets by reducing the moisture content of the pellets and hardening the surface thereof thus preserving the pellet form. Heavy hard balls of metal or other resilient material are disposed in the central chamber and in compartments around the periphery of the cluster; the balls move about their compartments as the cluster rotates and knock against the walls of the tubes thus preventing the adherence of the material to the walls of the tubes. The vibration caused by the knocking of the balls also prevents the mass of moist powdered material from sliding within the tube thus facilitating the tumbling action of the material, which is so necessary to the proper pelletizing thereof.

The cluster conforms in length and in circumference to the conventional pelletizing drum. In the conventional drum there is a single large mass of material which causes a great deal of the material to slide on the surface of the drum, whereas the material must roll or tumble about the drum in order to form into pellets. The material introduced into the apparatus of this invention will be divided into five parts; and the reduced mass in each tube will prevent the sliding which has been an objection arising from the presence of one large mass in the conventional drum.

Other objects and advantages of the present invention will be apparent from the specification claims and drawings herein.

In the accompanying drawings, forming part of this application:

Figure 1 is a side elevation view of the apparatus;

Figure 2 is a cross-sectional view of the apparatus taken on line 2—2 of Figure 1;

Figure 3 is a cross-sectional view of the apparatus taken on line 3—3 of Figure 2;

Figure 4 is a side elevation view of a modification of the apparatus shown in Figure 1;

Figure 5 is a cross-sectional view of the apparatus of Figure 4 on line 5—5 of Figure 4; and Figure 6 is a cross-sectional view of the apparatus of Figures 4 and 5 on line 6—6 of Figure 5.

In the drawings similar numbers refer to similar parts throughout the several views.

In Figures 1 to 3 of the drawings, there is shown a large drum 1 having circumferentially spaced therearound bearing blocks 2 on which are mounted bearing rings 4 which support a large drum 1 on rollers 5. A frame work 6 is provided for supporting the rollers 5 mounts the drum 1 on a slight angle to the horizontal, with the inlet end 7 of the drum 1 being located higher than the outlet end so that the material placed in the drum 1 will slowly work toward the outlet end of the drum. A sprocket ring 8 is placed around the drum 1 and the sprocket ring 8 and drum 1 are rotated by a chain 9 from a motor 10 through reduction gear 11.

With the apparatus of this invention the size of the granules or pellets produced will vary with the speed of rotation of the drum 1. The maximum yield of granules of commercial fertilizer of sufficient size for commercial acceptance is produced by the apparatus of this invention when the drum 1 is rotated at 10 to 12 revolutions per minute. However, when the composition of the material to be processed changes the critical number of revolutions per minute changes. Also, when it is desired to produce pellets of larger size or smaller size the number of revolutions per minute also must be changed. Therefore, the apparatus may be provided with a variable speed transmission, such as, for example, the Reeves Variable Speed Transmission.

The drum 1 has welded to its inner circumference a cluster 3 of tubes 12. Each tube 12 is welded to the next adjacent tube 12 and each tube is hollow and cylindrical in shape. At the center of the cluster 3 is an elongated chamber closed at each end and partitioned into three compartments 13 by walls 14. Around the periphery of the cluster 3 are five elongated three-sided chambers each being closed at each end and partitioned into three compartments $13^1$ by $14^1$. In each compartment 13 and $13^1$ is a knocking ball 15.

The knocking balls 15 are heavy hard balls of metal or other resilient material. As the drum 1 rotates clockwise the knocking balls 15 follow the outer walls of their respective compartments 13 or $13^1$ in a counter-clockwise direction, striking each wall thereof, in turn. The movement of the balls 15 and the striking thereby of the compartment walls provide a continuous vibration which effectively prevents the substance being processed from adhering to the walls of the tubes 12, prevents the substance from sliding and facilitates the rolling or tumbling of the substance. Should the materials employed in the construction of the apparatus require it, the compartments 13 or $13^1$ may be provided with knocking plates 16 to receive the blows of the balls 15 and to prevent the balls from becoming lodged in the V-shaped crevices formed by joinder of the tube walls to each other and to the drum wall. Also, if greater knocking effect is required there may be provided stops 19 which will delay the movement of the balls at certain points along their counter-clockwise path thus increasing the knocking force upon their release. Such knocking plates 16 and stops 19 may be employed as are shown in my U.S. Patent No. 2,871,510. Since there are three separate compartments 13 in the central chamber and three separate compartments 13 in each of the five elongated three-sided chambers, each having a knocking ball 15 therein, each tube will receive a multiplicity of blows substantially throughout its length with every revolution of the drum.

Depending upon the substance to be processed, greater or lesser knocking force will be required, also each knocking ball 15 will be worn down in size upon continued use. Therefore, each compartment $13^1$ is provided with a hand hole and closure 20 providing access to the balls 15 therein. The partition wall 14 at the outlet end of the central chamber is provided with a hand hole and closures 21. The other partition walls 14 in the central chamber, with the exception of the wall at the inlet end thereof, are provided with hand holes 22. The hand hole and closure 21 and the hand holes 22 provide access to the balls 15 in the compartments 13 from the outlet end of the drum 1. It will be noted that the hand holes 22 are located in the center of partitions 14; therefore, while the balls may be removed from the compartments 13, they cannot escape accidentally from their assigned compartments.

At the inlet end 7 of the drum 1 is an integral inwardly disposed flange 17 which extends inwardly as far as the points at which the tubes 12 touch each other, that is to say to the points of tangency of the tubes. The flange 17 abuts against the ends of the tubes 12. This prevents piling up of the substance to be processed against the end walls $14^1$ and insures a steady flow of said substance into tubes 12. The flange 17 is provided with an integral outwardly disposed funnel shaped rotating dividing chute 18. A stationary chute 23 is disposed in the rotating dividing chute 18.

At the outlet end of the drum 1 the drum extends a short distance beyond the end of the cluster 3. The drum 1 extends into a stationary discharge funnel 24. Projecting through the discharge funnel 24 is air blower pipe 25.

In the operation of the apparatus shown in Figures 1 to 3, the drum 1 is set in motion at a pre-determined number of revolutions per unit of time. The moist powder is fed at a regulated rate from the stationary chute 23 onto the inner surface of the rotating dividing chute 18. The powder rolls circumferentially on the surface of the rotating dividing chute 18, progresses toward the tubes 12 and is divided evenly among the tubes 12 at a steady flow. During each revolution of the drum 1 each of the tubes 12, of course, makes a complete turn about the longitudinal axis of the drum. The substance in each tube 12 rolls or tumbles constantly and also progresses slowly toward outlet end of the drum 1 simply by force of gravity. During the entire operation a stream of air is forced through the tubes 12 from the blower 25 in the outlet end of the drum 1 and ultimately escapes through the stationary inlet chute 23.

The tumbling or rolling action causes the moist powder or other similar material to form into small granules or pellets and the air stream confirms the formation by reducing the moisture content thereof and hardening the surfaces of the pellets.

All during the granulating process the knocking balls 15 continue their vibration which prevents adherence of the substance to the tube walls, prevents slipping and facilitates the tumbling or rolling action.

The structure shown in Figures 4 to 6 is similar to that shown in Figures 1 to 3 except that the drum 1 is omitted. The cluster 3 is formed exactly as shown in Figures 1 to 3. Knocking ball compartments $13^{11}$ are formed by providing walls $14^{11}$ in the area of the sprocket ring 8 and the bearing rings 4. The tubes 12 are provided at the inlet end with segment shaped closures $17^1$ which extend inwardly to the point at which the tubes 12 touch each other. The closures $17^1$ are formed integral with an outwardly disposed funnel shaped rotating dividing chute $18^1$, into which is disposed the stationary inlet chute 23.

The outlet end is provided with a cylindrical member 26 which extends from the bearing ring at that end into discharge funnel 21.

The operation of the apparatus in Figures 4 to 6 is the same as in Figures 1 to 3. The distinctive feature of this modification is the omission of the drum 1. This allows easy attachment of temperature control apparatus directly to the walls of the tubes 12, facilitates repairs and incidentally effects a saving in material.

Specific embodiments of the invention have been described for the purpose of illustration, and it is not intended that the inventor be limited in his protection to the specific embodiments shown herein; on the contrary, the inventor expressly reserves to himself all structure and apparatus which falls within the scope of his invention.

What is claimed as new and is desired to be secured by Letters Patent is:

1. Granulator apparatus for agglomerating moist powdered materials, comprising, a plurality of hollow substantially cylindrical tubes grouped symmetrically about a central axis of rotation to form a rotatable cluster of tubes, spaced, peripherally arranged bearing members surrounding said cluster of tubes for supporting said cluster of tubes for rotation about its axis of symmetry, said tubes being integrally secured together so as to form a central longitudinally extending chamber therebetween, motor means including a chain and sprocket drive for rotating said cluster of tubes about said axis of symmetry, the inlet end of said cluster of tubes being positioned higher than the outlet end thereof so that, upon rotation of said cluster of tubes by said chain and sprocket drive, the material deposited in said cluster of tubes gravitates to said opposite end thereof, closure means located at said inlet and outlet ends of said cluster of tubes for closing said chamber formed by said cluster of tubes, spaced partition walls for dividing said central chamber into a plurality of spaced interior compartments, structure for forming a plurality of longitudinally spaced compartments positioned externally and adjacent to each two succeeding tubes of said cluster of tubes to form a plurality of exterior and longitudinally spaced compartments about the periphery of said cluster of tubes, at least one movable ball weight in each of said interior and exterior compartments, with the ball weights in said interior compartments being arranged to move in a direction opposite to the movement of the ball weights in said exterior compartments for periodically striking the exterior walls of said cluster of tubes to prevent adherence of the agglomerative material to the interior tube walls, feed means including a funnel shaped member positioned at said inlet end of said cluster of tubes and movable therewith for evenly feeding powdered materials to each tube of said cluster of tubes, with said funnel shaped member converging and projecting away from said inlet end of said cluster of tubes, and means located at said outlet end of said cluster of tubes for forcing air through each tube of said cluster of tubes countercurrently to the direction of progress of the agglomerative powdered materials through said cluster of tubes.

2. Granulator apparatus as recited in claim 1, and additionally a plurality of stops in each said interior and exterior compartment for delaying the fall of said ball weights against the walls of said tubes, thereby increasing the striking forces of said ball weights.

3. Granulator apparatus as recited in claim 1 and additionally an outer housing shrouding said cluster of tubes.

4. Granulator apparatus as recited in claim 1, wherein said exterior compartments are arranged in each said bearing member with a ball weight deposited therein.

References Cited in the file of this patent
UNITED STATES PATENTS

| | | |
|---|---|---|
| 2,268,816 | Gabeler et al. | Jan. 6, 1942 |
| 2,543,898 | De Vaney | Mar. 6, 1951 |
| 2,627,642 | Osborne | Feb. 10, 1953 |

FOREIGN PATENTS

| | | |
|---|---|---|
| 150,534 | Australia | Mar. 17, 1953 |
| 717,232 | France | Oct. 19, 1931 |